Patented Sept. 17, 1935

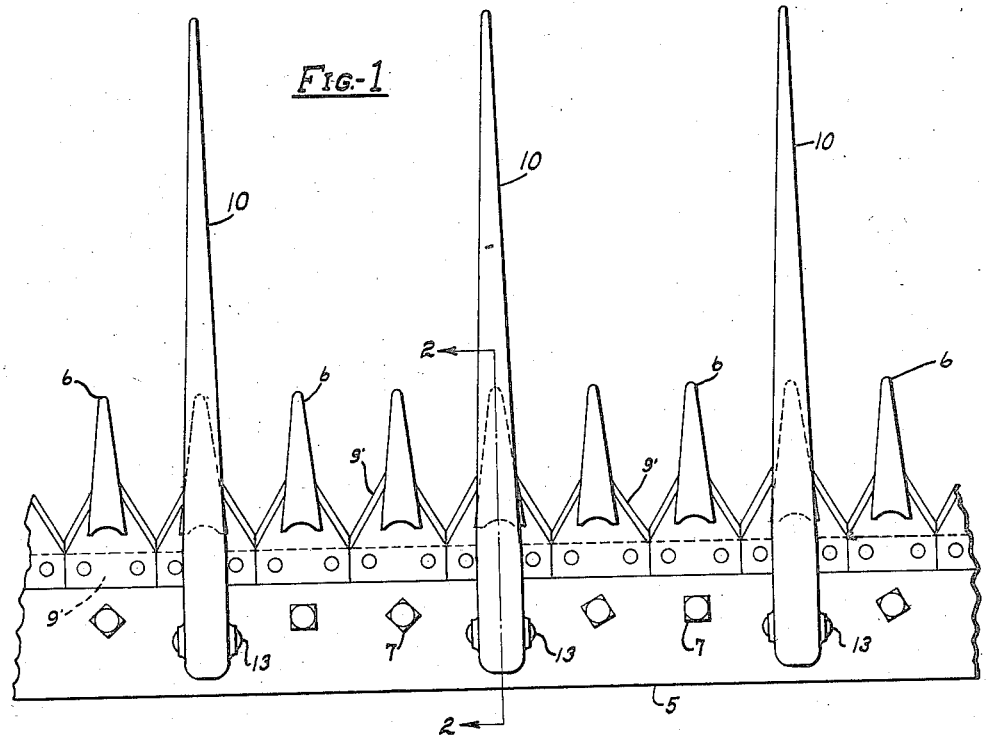
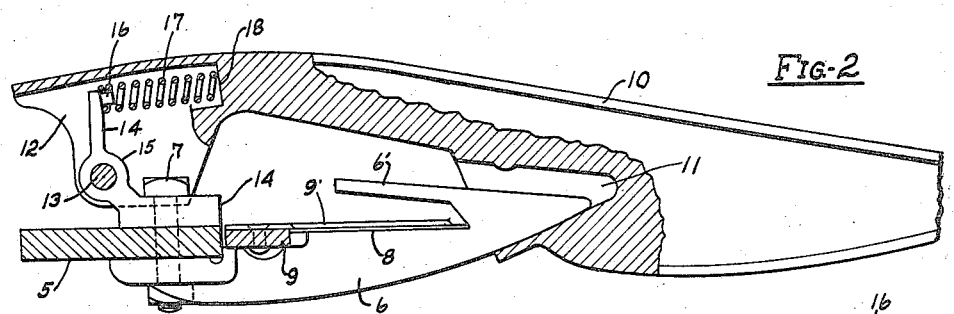
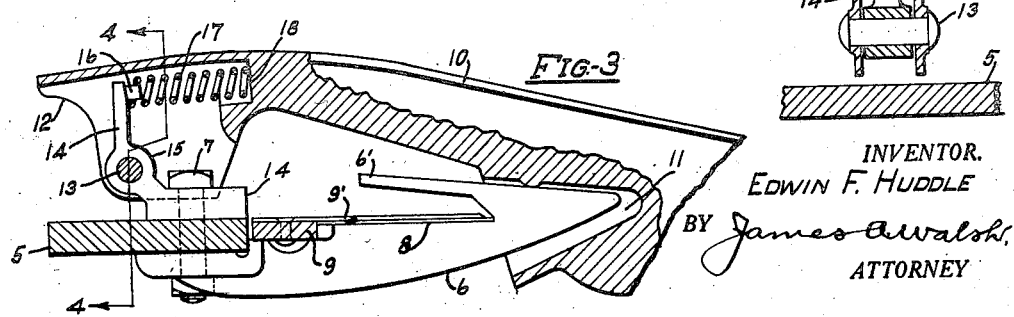
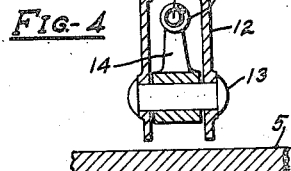

2,014,569

UNITED STATES PATENT OFFICE 2,014,569

MOWER

Edwin F. Huddle, Rockford, Ill., assignor to J. I. Case Company, Racine, Wis., a corporation Application March 17, 1934, Serial No. 716,051

5 Claims. (Cl. 56—313)

My present invention relates to mowers, and particularly to an improved lifting or pick-up guard adapted to be directly and yieldingly attached to the finger-bar thereof for raising down grain, pea vines and the like, to be severed by the mower cutting mechanism as it is drawn through the field, my object being to provide a plurality of such lifting guards spaced farther apart than the usual guard-fingers and cooperating with the latter to more effectively gather and cut the crop.

In the accompanying drawing, forming a part hereof, Figure 1 is a fragmentary plan view of the mower cutting mechanism with my improved lifting guards mounted thereon; Figs. 2 and 3, fragmentary side elevations of one of said guards taken on the dotted lines 2—2 in Fig. 1 showing the lifting guard in raised and normal positions, respectively; and Fig. 4 is a detail section taken on the dotted line 4—4 in Fig. 3.

In said drawing the numeral 5 indicates the usual finger-bar to which a series of guard-fingers 6 are bolted or otherwise secured, at 7, and each provided with a ledger-plate 8 between which and the guard-finger extension 6' the sickle-bar 9 and blades 9' are disposed, as is common.

The lifting guard comprises a forwardly tapering body 10 having a socket 11 intermediate its ends adapted to fit loosely over the outer end of the guard-finger 6 in free floating relation thereto, and at its rear end terminates in side members 12 by which it is pivotally mounted, at 13, upon a support 14 embodying a bearing 15 and a suitable keeper, as 16, for receiving the rear end of a compression spring 17 having its forward end seated in a socket 18 in body 10, the support 14 being secured by the bolt 7 to the finger-bar 5 as clearly indicated in Fig. 2.

As indicated in Fig. 3, the lifting guard 10, through the expansion action of spring 17, normally maintained in relation to the guard-finger 6, resting upon the extension 6', as shown, such contact limiting the downward movement of the lifting guard, so that it will glide over even ground surfaces in substantially such position. When encountering ground irregularities, however, the lifting guard will be thrust upwardly in relation to its pivotal connection at 13 and at the same time compress spring 17 in accordance with the degrees of its upward movements, being limited in such direction by contact of the lower wall of its socket 11 with the under side of guard-finger 6, as indicated in Fig. 2, said spring constantly urging the lifting guard downwardly to follow field depressions and irregularities, as will be understood.

I am aware that yieldingly controlled lifting guards have been proposed, but to the best of my knowledge yielding devices have been applied thereto remotely from the finger-bar 5 and requiring details of construction not necessary in my simple and practical improvement, which, as described, comprises a guard yieldingly mounted directly on the finger-bar unattached to the guard-finger and in free floating relation to the latter.

I claim as my invention:

1. A lifting guard for the guard-finger of a mower having a finger-bar, said lifting guard embodying a socket for receiving the forward end of the guard-finger, a support including a keeper secured directly to the finger-bar for pivotally connecting the lifting guard to said bar, and yielding means engaging the keeper and the rear portion of the lifting guard for controlling the movements of the lifting guard in relation to the guard-finger.

2. A lifting guard for the guard-finger of a mower having a finger-bar, said lifting guard embodying depending walls at its rear end and a socket intermediate its ends for receiving the forward end of the guard-finger, a support embodying a bearing secured directly to the finger-bar, means for pivotally connecting the bearing and depending walls, and a spring abutting the support and the rear end of the lifting guard for controlling the movements of the latter.

3. A lifting guard for the guard-finger of a mower having a finger-bar, comprising a member having a socket therein for receiving the forward end of the guard-finger, means at the rear end of the lifting guard and connected directly to the finger-bar for pivotally connecting the lifting guard to said bar and means in the rear end of the lifting guard engaging the pivotally connecting means for exerting pressure to force lifting guard downwardly.

4. A lifting guard for the guard-finger of a mower having a finger-bar, comprising a member having a socket therein for receiving the forward end of the guard-finger and means in its rear end for retaining a spring, means at the rear end of the lifting guard and connected directly to the finger-bar for pivotally connecting the lifting guard to said bar, and a spring engaging the pivotally connecting means and said retaining means for exerting pressure to force the lifting guard downwardly.

5. A lifting guard for the guard-finger of a mower having a finger-bar, comprising a member having a socket therein for receiving the forward end of the guard-finger and a socket in its rear portion for retaining a spring, means including a support at the rear end of the lifting guard and connected directly to the finger-bar for pivotally connecting the lifting guard to said bar, and a spring engaging the support and said rear socket for normally forcing the lifting guard downwardly in relation to the guard-finger.

EDWIN F. HUDDLE.